(12) United States Patent
Park

(10) Patent No.: US 8,987,951 B2
(45) Date of Patent: Mar. 24, 2015

(54) LINEAR VIBRATOR

(75) Inventor: Youngil Park, Seoul (KR)

(73) Assignee: EM-Tech Co., Ltd, Busan (KR)

( * ) Notice: Subject to any disclaimer, the term of this patent is extended or adjusted under 35 U.S.C. 154(b) by 481 days.

(21) Appl. No.: 13/211,934

(22) Filed: Aug. 17, 2011

(65) Prior Publication Data

US 2012/0104875 A1    May 3, 2012

(30) Foreign Application Priority Data

Oct. 27, 2010 (KR) .................. 10-2010-0105199

(51) Int. Cl.
 *H02K 33/16* (2006.01)
(52) U.S. Cl.
 CPC ..................... *H02K 33/16* (2013.01)
 USPC ...................... 310/25; 310/12.22
(58) Field of Classification Search
 None
 See application file for complete search history.

(56) References Cited

U.S. PATENT DOCUMENTS

| 5,023,495 A * | 6/1991 | Ohsaka et al. ............. 310/12.15 |
| 7,355,305 B2 * | 4/2008 | Nakamura et al. ......... 310/12.03 |
| 2010/0213773 A1 * | 8/2010 | Dong et al. .................... 310/25 |
| 2010/0231060 A1 * | 9/2010 | Bang et al. ..................... 310/25 |

FOREIGN PATENT DOCUMENTS

| JP | 57075549 A * | 5/1982 | ............ H02K 13/00 |
| JP | 2001238427 A * | 8/2001 | ............ H02K 33/18 |
| JP | 2009-213952 A | 9/2009 | |
| KR | 10-0992264 B1 | 11/2010 | |

OTHER PUBLICATIONS

Office Action dated Sep. 23, 2012 in Korean Application No. 10-2010-0105199, filed Oct. 27, 2010.

\* cited by examiner

*Primary Examiner* — Tran Nguyen
(74) *Attorney, Agent, or Firm* — Murphy, Bilak & Homiller PLLC

(57) ABSTRACT

Disclosed is a linear vibrator, the linear vibrator including a stator having first and second coil blocks coupled to a bottom plate of a casing, a vibrator having a magnet disposed at a position corresponding to the first and second coil blocks, and an elastic member elastically supporting the magnet.

11 Claims, 3 Drawing Sheets

LINEAR VIBRATOR

CROSS-REFERENCE TO RELATED APPLICATION

This present application claims the benefit under 35 U.S.C. §119 of Korean Patent Application No. 10-2010-0105199, filed Oct. 27, 2010, which is hereby incorporated by reference in its entirety.

BACKGROUND OF THE INVENTION

1. Field of the Invention

The present invention relates to a linear vibrator.

2. Description of the Related Art

Recently, small electronic products, such as mobile communication equipment, portable game machines, portable MP3 players and small home game machines, have been developed. The above-mentioned small electronic products include a display unit for transmitting data in the form of an image, and a sound unit for transmitting data in the form of voice. In recent, vibration motors that transmit data using vibrations have been mounted to the small electronic products.

The vibration motors mounted on the small electronic products require the function of generating strong vibrations as well as small size.

A conventional vibration motor includes a weight to increase vibrations. However, the weight limits areas of a magnet and a coil, thus limiting vibrations.

In order to increase vibrations of the vibration motor, an increase in size of the magnet is required. However, the simple increase in size of the magnet does not positively affect the increase in vibrations.

That is, if the size of the magnet increases, an increase in size of the wound coil is also required to correspond to the increase in size of the magnet. When the size of the coil increases, a portion of the coil which does not generate electromagnetic force is also increased, so that it is difficult to increase vibrations.

BRIEF SUMMARY

Accordingly, the present invention provides a linear vibrator, which improves the structure of a magnet and a coil corresponding to the magnet so as to increase vibrations.

In one general aspect of the present invention, there is provided a linear vibrator, the linear vibrator comprising: a stator including first and second coil blocks coupled to a bottom plate of a casing, a vibrator including a magnet disposed at a position corresponding to the first and second coil blocks, and an elastic member elastically supporting the magnet.

DETAILED DESCRIPTION

Figure 1:
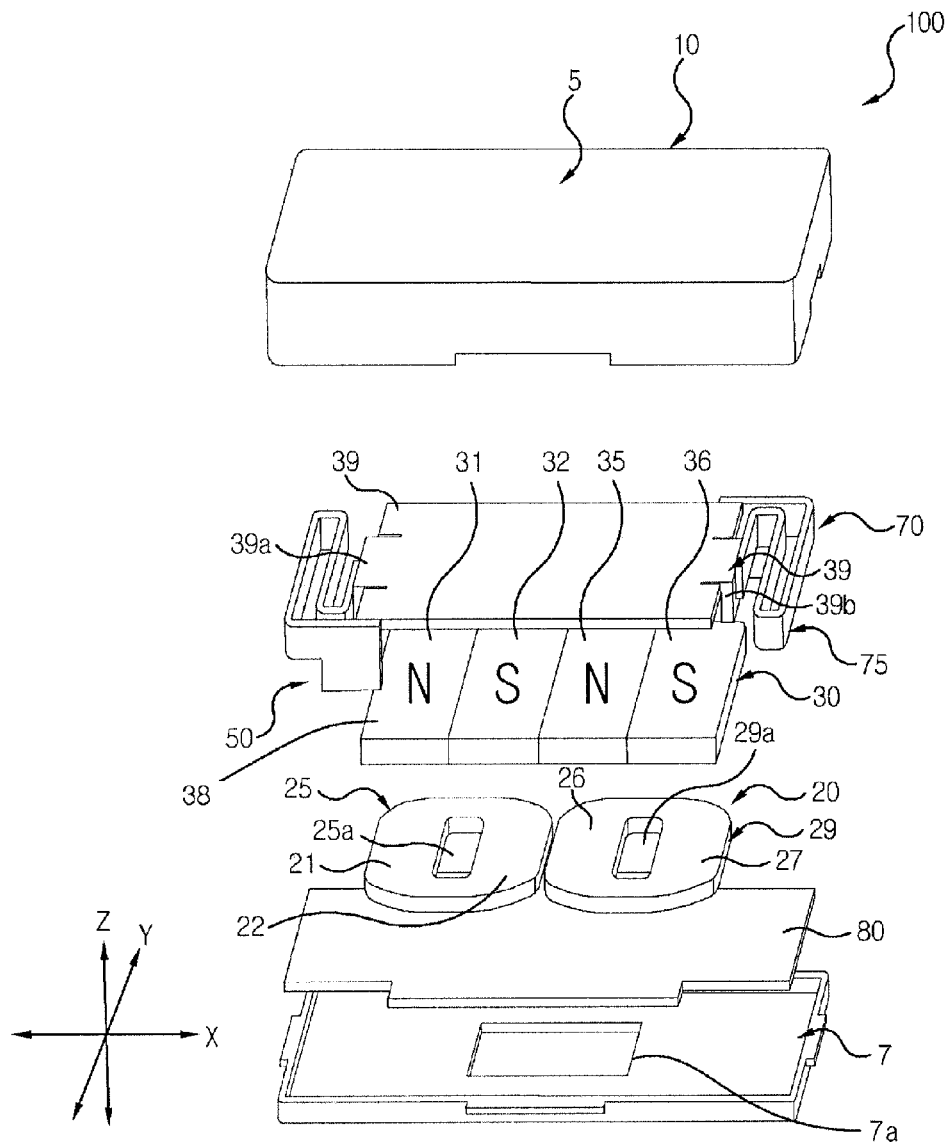
FIG. 1 is an exploded perspective view showing a linear vibrator in accordance with an exemplary embodiment of the present invention.
Figure 2:
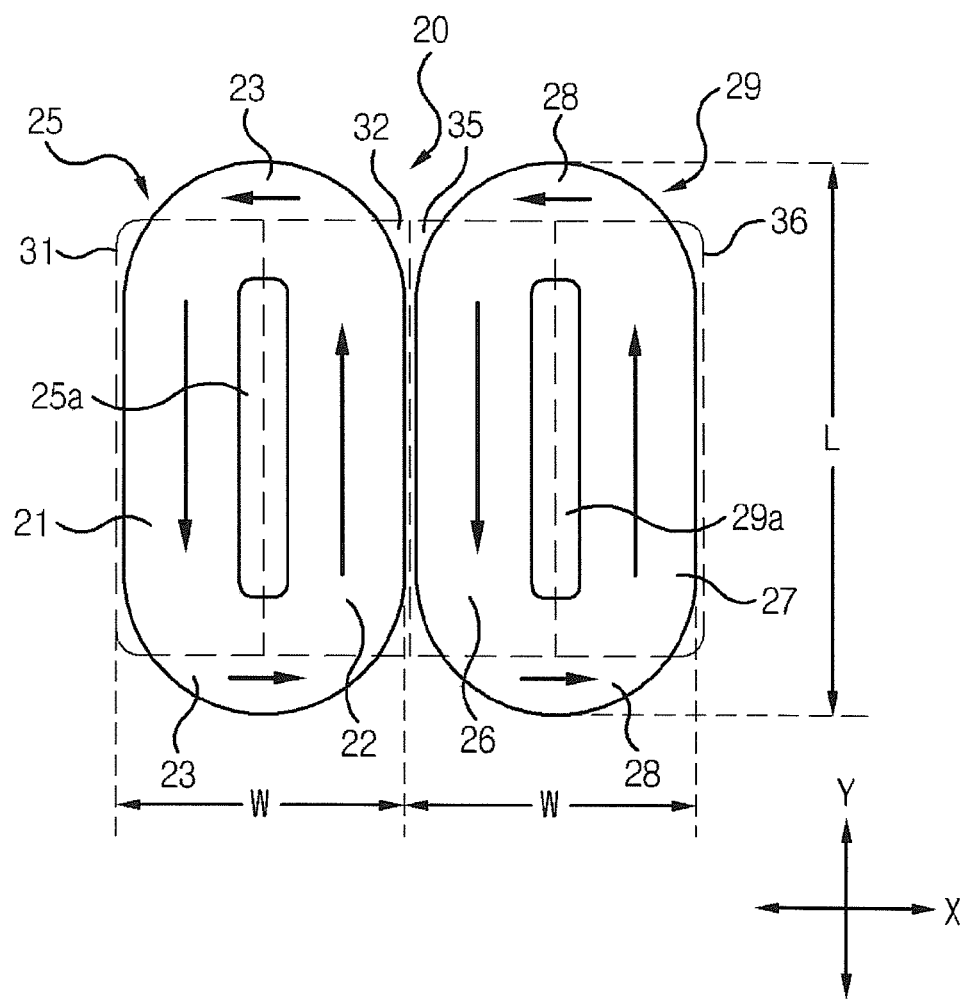
FIG. 2 is a plan view showing a magnet and first and second coil blocks of the linear vibrator of FIG. 1.
Figure 3:
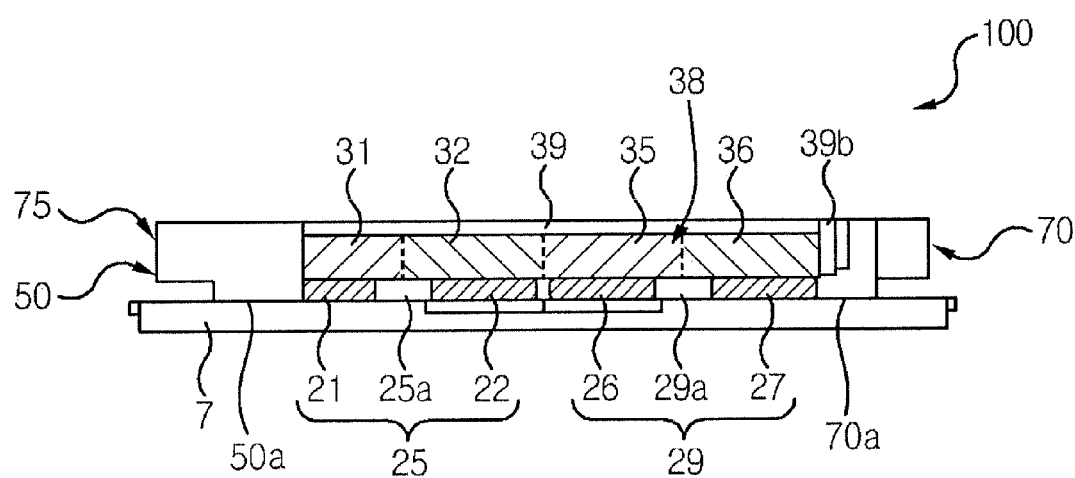
FIG. 3 is a side view showing the assembled state of the linear vibrator illustrated in FIG. 1.

FIG. 1 is an exploded perspective view showing a linear vibrator in accordance with an exemplary embodiment of the present invention. FIG. 2 is a plan view showing a magnet and first and second coil blocks of the linear vibrator of FIG. 1. FIG. 3 is a side view showing the assembled state of the linear vibrator illustrated in FIG. 1.

Referring to FIGS. 1 to 3, a linear vibrator 100 includes a casing 10, a stator 20, a vibrator 30 and elastic members 75. In addition to these components, the linear vibrator 100 may further include a circuit board 80. The circuit board 80 is electrically connected to the stator 20.

The casing 10 includes an upper casing 5 and a lower casing 7. The casing 10 functions to receive and hold the stator 20, the vibrator 30 and the elastic members 75 that will be described below in detail.

The upper casing 5 has the shape of a rectangular parallelepiped box that is open at a bottom thereof, for example. The upper casing 5 may be formed by machining an electromagnetic-wave shielding metal plate so as to shield electromagnetic waves generated from the linear vibrator 100.

The lower casing 7 is shaped like, for example, a flat plate. The lower casing 7 is combined with the upper casing 5, thus defining a receiving space in the casing 10. An opening 7a is formed in the lower casing 7 to expose a terminal of the circuit board 80 that will be described below.

Referring to FIG. 2, the stator 20 is disposed on an upper surface of the lower casing 7 of the casing 10.

The stator 20 includes a first coil block 25 and a second coil block 29. According to the embodiment of the present invention, the first and second coil blocks 25 and 29 are placed to be adjacent to each other.

The first coil block 25 is placed on the circuit board 80 that is disposed on the upper surface of the casing 10. The first coil block 25 may have the shape of an oblong pillar that has at a central portion thereof an oblong hole 25a oriented in a Y-axis direction of FIG. 2.

The first coil block 25 is formed by winding a coil. The first coil block 25 is disposed on the upper surface of the lower casing 7.

The first coil block 25 is divided into a first coil portion 21 and a second coil portion 22 based on a current direction. When current is applied to the first coil block 25, current flows through the first and second coil portions 21 and 22 in opposite directions, so that magnetic fields of opposite polarities are formed in the first and second coil portions 21 and 22.

Each of the first and second coil portions 21 and 22 of the first coil block 25 has a length L, and the first coil block 25 including the first and second coil portions 21 and 22 has a width W. According to the embodiment of the present invention, the length L of each of the first and second coil portions 21 and 22 is greater than the width W of the first coil block 25.

To be more specific, according to the embodiment of the present invention, the length L of each of the first and second coil portions 21 and 22 is two or more times as great as the width W of the first coil block 25.

In the embodiment of the present invention, the reason why the length L of each of the first and second coil portions 21 and 22 is greater than the width W of the first coil block 25 is because a connecting portion 23 connecting the first and second coil portions 21 and 22 of the first coil block 25 to each other does not generate force for vibrating the vibrator 30 that will be described below in detail. Thus, the longer the length of the connecting portion 23 is, the lower the vibration characteristic of the vibrator 30 is. Further, the shorter the length of the connecting portion 23 is, the higher the vibration characteristics of the vibrator 30 is.

Similarly to the first coil block 25, the second coil block 29 may have the shape of an oblong pillar that has at a central portion thereof an oblong hole 29a oriented in a Y-axis direction of FIG. 2. The second coil block 29 and the first coil block 25 are arranged side by side.

The second coil block 29 is formed by winding a coil. The second coil block 29 is placed on the circuit board 80 that is disposed on the upper surface of the lower casing 7.

The second coil block 29 is divided into a third coil portion 26 and a fourth coil portion 27 based on a current direction. When current is applied to the second coil block 29, current flows through the third and fourth coil portions 26 and 27 in opposite directions, so that magnetic fields of opposite polarities are formed in the third and fourth coil portions 26 and 27.

In the embodiment of the present invention, the third coil portion 26 of the second coil block 29 is disposed to face the second coil portion 22 of the first coil block 25, and the first to fourth coil portions 21, 22, 26 and 27 of the first and second coil blocks 25 and 29 are arranged to be parallel to each other.

Each of the third and fourth coil portions 26 and 27 of the second coil block 29 has the length L, and the second coil block 29 including the third and fourth coil portions 26 and 27 has the width W. According to the embodiment of the present invention, the length L of each of the third and fourth coil portions 26 and 27 is greater than the width W of the second coil block 29.

To be more specific, according to the embodiment of the present invention, the length L of each of the third and fourth coil portions 26 and 27 is two or more times as great as the width W of the second coil block 29.

In the embodiment of the present invention, the reason why the length L of each of the third and fourth coil portions 26 and 27 is greater than the width W of the second coil block 29 is because a connecting portion 28 connecting the third and fourth coil portions 26 and 27 of the second coil block 29 to each other does not generate force for vibrating the vibrator 30 that will be described below in detail. Thus, the longer the length of the connecting portion 28 is, the lower the vibration characteristic of the vibrator 30 is. Further, the shorter the length of the connecting portion 28 is, the higher the vibration characteristics of the vibrator 30 is.

In the embodiment of the present invention, the first and second coil blocks 25 and 29 placed to be adjacent to each other are connected to each other in series. Current flows through the first coil portion 21 of the first coil block 25 and the third coil portion 26 of the second coil block 29 in a first direction, while current flows through the second coil portion 22 of the first coil block 25 and the fourth coil portion 27 of the second coil block 29 in a second direction that is opposite to the first direction.

For example, an N-pole magnetic field is generated from the first coil portion 21 of the first coil block 25 and the third coil portion 26 of the second coil block 29 through which current flows in the first direction, and an S-pole magnetic field is generated from the second coil portion 22 of the first coil block 25 and the fourth coil portion 27 of the second coil block 29 through which current flows in the second direction.

Turning back to FIG. 1, the vibrator 30 includes a four-pole magnet 38 and a yoke plate 39. In the embodiment of the present invention, since the four-pole magnet 38 of the vibrator 30 serves as a weight, the linear vibrator 100 does not require an additional weight.

The four-pole magnet 38 includes first to fourth magnet portions 31, 32, 35 and 36. In the embodiment of the present invention, the first to fourth magnet portions 31, 32, 35 and 36 constituting the four-pole magnet 38 are integrated with each other. The first to fourth magnet portions 31, 32, 35 and 36 are formed in such a way that different magnetic poles alternate with each other.

The first and second magnet portions 31 and 32 are placed on the first coil block 25.

The first magnet portion 31 is placed at a position corresponding to the first coil portion 21 of the first coil block 25, and the second magnet portion 32 is placed at a position corresponding to the second coil portion 22 of the first coil block 25. The first and second magnet portions 31 and 32 have the shape of a rectangular parallelepiped plate, a long side of which is formed in the Y-axis direction defined in FIG. 1.

In the embodiment of the present invention, when the magnetic field having the N polarity is generated from the first coil portion 21 of the first coil block 25, the first magnet portion 31 generates the magnetic field having the N polarity, which is the same as the magnetic field generated from the first coil portion 21.

Further, when the magnetic field having the S polarity is generated from the second coil portion 22 of the first coil block 25, the second magnet portion 32 generates the magnetic field having the S polarity, which is the same as the magnetic field generated from the second coil portion 22.

The third and fourth magnet portions 35 and 36 are placed on the second coil block 29.

The third magnet portion 35 is placed at a position corresponding to the third coil portion 26 of the second coil block 29, and the fourth magnet portion 36 is placed at a position corresponding to the fourth coil portion 27 of the second coil block 29. The third and fourth magnet portions 36 and 37 have the shape of a rectangular parallelepiped plate, a long side of which is formed in the Y-axis direction defined in FIG. 1.

In the embodiment of the present invention, when the magnetic field having the N polarity is generated from the third coil portion 26 of the second coil block 29, the third magnet portion 36 generates the magnetic field having the N polarity, which is the same as the magnetic field generated from the third coil portion 26.

Further, when the magnetic field having the S polarity is generated from the fourth coil portion 27 of the second coil block 29, the fourth magnet portion 37 generates the magnetic field having the S polarity, which is the same as the magnetic field generated from the fourth coil portion 27.

Turning back to FIG. 1, the yoke plate 39 is disposed on an upper surface of the magnet 38, and has the shape of a metal plate. First and second coupling plates 39a and 39b are provided on both ends of the yoke plate 39 to grip the first magnet portion 31 and the fourth magnet portion 36 of the magnet 38.

Referring to FIG. 1, the elastic member 75 includes a first elastic member 50 and a second elastic member 70.

The first elastic member 50 is formed by bending a band-shaped metal plate at least two or more times, the metal plate having the shape of a rectangular parallelepiped which has length greater than width. One surface of the first elastic member 50 is coupled to the first coupling plate 39a of the yoke plate 39, while the other surface that is opposite to the one surface of the first elastic member 50 is coupled to the upper surface of the lower casing 7.

The second elastic member 70 is formed by bending a band-shaped metal plate at least two or more times, the metal plate having the shape of a rectangular parallelepiped which has length greater than width. One surface of the second elastic member 70 is coupled to the second coupling plate 39b of the yoke plate 39, while the other surface that is opposite to the one surface of the second elastic member 70 is coupled to the upper surface of the lower casing 7.

In an embodiment of the present invention, the first and second elastic members 50 and 70 have the same shape. The second elastic member 70 is obtained by rotating the first elastic member 50 at 180° on a plane about the center of the yoke plate 39, and is coupled to the second coupling plate 39b and the upper surface of the lower casing 7.

As described above, the present invention provides a linear vibrator, which includes at least two coil blocks and a magnet disposed on the coil blocks and formed by integrating four magnetic poles with each other, thus reducing a section that does not generate repulsive force and attractive force, and thereby increasing vibrations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear vibrator, comprising:
   a stator including first and second coil blocks coupled to a lower casing;
   a vibrator including a magnet disposed at a position corresponding to the first and second coil blocks;
   a yoke plate placed over the magnet and supporting the magnet;
   an elastic member elastically supporting the magnet; and
   a circuit board installed at the lower casing, the first and second coil blocks and the circuit board being electrically connected to one another;
   wherein an opening is formed through the lower casing to expose the circuit board, and a terminal of the circuit board is exposed through the opening;
   wherein the yoke plate comprises first and second coupling plates that are coupled to first and second ends of the magnet, respectively;
   wherein the elastic member comprises: a first elastic member, one distal end of the first elastic member being coupled to the first coupling plate and the other distal end of the first elastic member having a first contact portion formed at bottom of the other distal end, and the first contact portion contacting the lower casing; and a second elastic member, one distal end of the second elastic member being coupled to the second coupling plate and the other distal end of the second elastic member having a second contact portion formed at bottom of the other distal end, and the second contact portion contacting the lower casing;
   wherein the magnet comprises a four-pole magnet alternately having four different magnetic poles, the four-pole magnet including first to fourth magnet portions wherein each magnet portion has a magnetic pole;
   wherein the first coil block includes first and second coil portions that are disposed at positions corresponding to the first and second magnet portions, respectively, and the second coil block comprises third and fourth coil portions that are disposed at positions corresponding to the third and fourth magnet portions, respectively;
   wherein each of the first, second, third, and fourth coil portions is configured to vertically align with its corresponding magnet portion without overlapping with any adjacent magnet portions; and
   wherein a length of each of the first and second coil portions is configured to be two or more times as great as a width of the first coil block, and a length of each of the third and fourth coil portions is configured to be two or more times as great as a width of the second coil block, such that vibrations of connecting portions connecting the first and second coil portions and vibrations of connecting portions connecting the third and fourth coil portions are inhibited.

2. The linear vibrator as set forth in claim 1, wherein the second coil portion of the first coil block and the third coil portion of the second coil block are adjacent to each other.

3. The linear vibrator as set forth in claim 2, wherein current flows through the first and third coil portions in a first direction, and current flows through the second and fourth coil portions in a second direction that is opposite to the first direction.

4. The linear vibrator as set forth in claim 2, wherein the first and third magnet portions have the same magnetic pole, and the second and fourth magnet portions have the same magnetic pole.

5. The linear vibrator as set forth in claim 1, wherein the first coil block and the second coil block are electrically connected to each other in series.

6. The linear vibrator as set forth in claim 1, wherein each of the first and second elastic members is formed by bending a band-shaped metal plate at least two times in a zigzag fashion, the metal plate having a shape of a rectangular parallelepiped having length that is greater than width.

7. The linear vibrator as set forth in claim 6, wherein the metal plate bent in the zigzag fashion is bent at 180°.

8. The linear vibrator as set forth in claim 1, wherein the first and second coil blocks are shaped like oblong pillars having oblong openings therein.

9. The linear vibrator as set forth in claim 8, wherein the oblong openings of the first and second coil blocks are arranged to be parallel to each other, and the first and second coil blocks are arranged to be adjacent to each other.

10. The linear vibrator as set forth in claim 1, wherein the casing comprises a lower casing in which the stator is disposed, and an upper casing which is combined with the lower casing to define a receiving space.

11. The linear vibrator as set forth in claim 8, wherein each of the upper and lower casings is made by machining a metal plate.

* * * * *